Patented Dec. 17, 1929

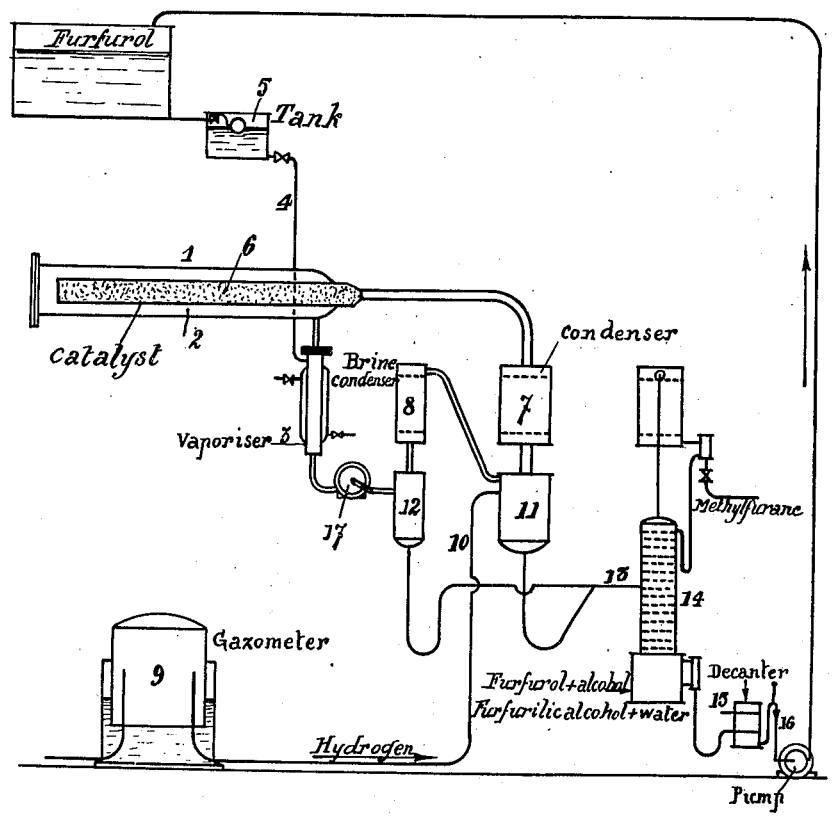

1,739,919

UNITED STATES PATENT OFFICE

ELOI RICARD AND HENRI MARTIN GUINOT, OF MELLE, FRANCE, ASSIGNORS TO SOCIETE ANONYME DES DISTILLERIES DES DEUX-SEVRES, OF MELLE (DEUX-SEVRES), FRANCE

PROCESS FOR THE MANUFACTURE OF FURFURYL ALCOHOL AND METHYLFURANE

Application filed December 29, 1927, Serial No. 243,376, and in France January 31, 1927.

Various researches have been made in order to obtain the catalytic hydrogenation of furfurol and to recognize the products of the reaction. Nickel, platinum, palladium and the oxides of platinum have been proposed as catalysts. Nickel in particular has been employed by Padoa and Ponti, who caused it to act at 190-200 degrees C. upon hydrogen and the vapor of furfurol. The other catalysts have been employed in wet processes. In all cases, the product of the hydrogenation is a complex mixture. In fact, the action of the hydrogen commences by the conversion of the furfurol into furfuryl alcohol, but it does not stop at this point, and it even proceeds as far as the formation of normal amyl alcohol. Various papers on this subject refer to the formation of the following products:—furfuryl alcohol, α methylfurfurane, tetrahydrofurfurylic alcohol, normal amyl alcohol, secondary amyl alcohol, methyl-propyl-ketone, pentanediol-1-2, pentanediol-1-5, tetra-hydromethylfurane.

On the other hand, certain authors state that the hydrogenation of furfurol causes a rapid diminution in the activity of the catalysts; for instance Kaufmann and Roger Adams show the necessity of renewing the activity of the platinum oxide during the hydrogenation of a given amount of furfurol in order to complete the reaction.

The nickel used by Padoa and Ponti for the hydrogenation of furfurol vapor also loses its activity rapidly, and this will no doubt explain the small amount of the hydrogenated product (30 c. c.) obtained by the authors for determining the nature of the resulting substances which consisted of furfuryl alcohol, methylfurane or sylvane, tetrahydro-α-methylfurane, propylmethylacetone, and secondary pentanol-2.

We have found that the hydrogenation of furfurol may be effected in an approved manner in the presence of copper as a catalyst, and the reaction hardly produces any other bodies than furfuryl alcohol and methylfurane or sylvane, which can be readily separated from one another. Also, the catalyst will preserve its activity for a long time, and this is a most important feature.

This process for the manufacture of furfuryl alcohol and methylfurane is the object of the present invention. In this process we preferably operate in the presence of an excess of hydrogen which is constantly returned to the catalyst. This latter is obtained by the reduction of copper oxide prepared by the usual methods of precipitation and calcination. It is advantageous to employ backing substances such as asbestos, pumice stone, kieselguhr, silica, kaolin or the like, and to give the catalyst a suitable form enabling a ready circulation of the gas.

In the drawing we have illustrated diagrammatically one embodiment of the apparatus in which the process herein described may be carried out.

The copper oxide is preferably reduced at a low temperature, for instance 140-200 degrees C. The furfurol is vaporized in a current of hot hydrogen and is circulated upon the catalyst which is brought to the proper temperature by suitable heating means. The reaction commences at 80 degrees C., and at 90 degrees C. it is already very active, whereas Padoa and Ponti state that with nickel they use a temperature of 190-200 degrees C., which is much above the boiling point of furfurol (162 degrees C.). The reaction continues without complication above 220 degrees C. It is of an exothermic nature. The proportion of methylfurane produced will increase with the temperature of the reaction.

By way of example, one kilogram of copper on an asbestos backing will permit the fixing of about 8000 liters of hydrogen per hour at 140 degrees C. The effectiveness of the catalyst, and also its duration, will vary considerably with the method of its preparation and reduction, and also with the rate of furfurol supply. A tube well filled with copper and normally supplied may last for several days without appreciable weakening. Should its acitivity diminish, the temperature can be gradually raised in order to maintain the speed of the reaction constant, The proportion of the methylfurane, which varies with the rate of supply, is about 10 to 20 per cent of the furfuryl alcohol formed when operating with a fresh catalyst at 140 degrees C.

When the catalyst has become inactive, it is again made active by very gradually passing a current of hot air through it; the tar substances deposited on the catalyst or on the tube itself are burned out, and the copper is converted into oxide. It can be reduced in the tube itself, and the catalyst is then ready for use.

During the hydrogenation of the furfurol, the vapor discharged from the apparatus is condensed by cooling and the excess of hydrogen is returned to the circulation. The condensed liquid contains furfurol, furfuryl alcohol, methylfurane and water.

The methylfurane which boils at 65 degrees is readily removed by ordinary distillation. On the contrary the furfurol whose boiling point is 162 degrees and the furfuryl alcohol, whose boiling point is 171 degrees, cannot be readily separated by the usual distillation, since their boiling points are near together. We have observed that they may be separated with facility by taking advantage of the following actions.

Furfurol forms with water a mixture having a minimum boiling point, which contains 35 per cent of furfurol, and whose boiling point is 97 degrees. After condensation, this mixture can be decanted; the furfurol thus separates out, and it can be again used in the circulation for the hydrogen process. In this manner, to separate all the furfurol, it need only be distilled in the presence of water.

On the contrary, the furfurylic alcohol will not form, with water, any such mixture having a minimum boiling point. However, a small amount of furfuryl alcohol will be distilled over with the water, but this amount is very small by reason of the great difference between the boiling points of these two substances. To remove this small quantity of furfuryl alcohol from the water with which it has been brought over, it is simply necessary to proceed with the usual rectification of the vapors, so that the water will come over in the first place and the furfuryl alcohol will remain in the pure state at the end of the distillation.

These operations take place at atmospheric pressure, or preferably in vacuo.

We have also observed that furfuryl alcohol when used alone or mixed with furfurol, will be hydrogenated in the same conditions as furfurol alone, and it thus produces methylfurane, so that if only the methylfurane is removed from the products of the hydrogenation, and if the mixture of furfurol and furfuryl alcohol is passed through the catalyst tube, all of the original furfurol can be converted into methylfurane. However, there will be produced in all cases a small amount of tetrahydrofurfurylic alcohol.

The furfuryl alcohol and the methylfurane, which posses valuable properties from an industrial standpoint, have hitherto been prepared only in the laboratory and in very small quantities. The present invention, by which they can now be obtained in large quantities, also covers these substances considered as new manufactured products. Finally, the methylfurane will form an excellent liquid fuel for use in internal combustion engines.

*Example*.—Let it be supposed that the furfurol is to be converted into methylfurane.

In the catalyzing furnace 1, heated to 140 degrees C. by suitable means such as steam, electric current or the like, we place the copper catlyst which has been disposed in such form that it will offer but little resistance to the gas current.

The current of hydrogen supplied by a blower 17 will proceed through the externally heated vaporizer 3 and will vaporize the furfurol which is supplied by the pipe 4. A float-feed tank 5 is used to obtain the regular feed.

The mixture of the furfurol vapor and hydrogen enters the catalyzing furnace; it passes in the first place through the annular space 2 and then upon the catalyst disposed at 6. A reaction will take place, with disengagement of heat, but this offers no prejudice to the operation in virtue of the arrangement we adopt for counter-flow circulation, whereby all excess of temperature is obviated. The vapor issuing from the catalyzing furnace passes through a water condenser 7 and then into a brine condenser 8, so that the condensed liquids can be automatically separated.

Since hydrogen is consumed in the reaction, a suction or vacuum will be produced at the point 11—12 of the apparatus, thus drawing in fresh hydrogen from the gas tank 9 through the pipe 10. The gas which has not reacted, and also the fresh hydrogen, are taken up by the blower 17 and are again circulated upon the catalyst.

The liquid condensed at 11 and 12 passes through the pipe 13 into a vertical distilling apparatus 14; at the top is removed the methylfurane and at the bottom a mixture of furfurol, furfuryl alcohol and a small proportion of water, which is allowed to settle in the decanting vessel 15 and is then sent into the feeding tank by the elevating pump 16, for a subsequent hydrogenation. In this manner the furfurol will be almost entirely converted into methylfurane at the end of the process.

What we claim is:—

1. Process for the manufacture of products of the hydrogenation of furfurol, which consists in mixing the vapor of furfurol with a great excess of hydrogen, and in circulating the mixture upon copper acting as a catalyst.

2. Process for the manufacture of furfurol alcohol and methylfurane by the hydrogenation of furfurol, which consists in mixing the vapor of furfurol with a great excess of hydrogen, and in circulating the mixture upon copper acting as a catalyst.

3. Process for the manufacture of products of the hydrogenation of furfurol, which consists in mixing the vapor furfurol with a great excess of hydrogen, and in circulating the mixture upon copper acting as a catalyst, the excess of hydrogen being again mixed with furfurol vapor for a further circulation upon the catalyst.

4. Process for the manufacture of products of the hydrogenation of furfurol, which consists in mixing the vapor of furfurol with a great excess of hydrogen and in circulating the mixture upon copper acting as a catalyst, said catalyst being heated to at least 80 degrees C.

5. Process for the manufacture of furfuryl alcohol and methylfurane which consists in vaporizing the furfurol in a current of hot hydrogen in excess; and in circulating the products upon copper heated to at least 80 degrees C.

6. Process for the manufacture of furfuryl alcohol and methylfurane which consists in vaporizing the furfurol in a current of hot hydrogen in excess, and in circulating the products upon copper heated to at least 80 degrees C., said copper being obtained by the reduction of copper oxide and being placed upon a catalyst carrier so disposed as to facilitate the gas circulation.

7. Process for the manufacture of furfuryl alcohol and methylfurane, which consists in vaporizing the furfurol in a current of hot hydrogen in excess, in circulating the mixture upon copper heated to at least 80 degrees C. in condensing the vapor discharged from the apparatus, the condensed liquid containing furfurol, furfurylic alcohol, methylfurane and water.

8. Process for the manufacture of furfuryl alcohol and methylfurane, which consists in vaporizing the furfurol in a current of hot hydrogen in excess, in circulating the mixture upon copper heated to at least 80 degrees C., in condensing the vapor discharged from the apparatus, the condensing liquid containing furfurol, furfurylic alcohol, methylfurane and water, in distilling the condensed liquid in such manner as to remove the methylfurane which is distilled off in the first place, whereas the furfurol and the water form a mixture having a minimum boiling point, in decanting this mixture to remove the furfurol, in placing this removed furfurol again in the circulation, and in treating the remaining mixture of the distillation to remove the furfuryl alcohol.

9. In a process for the manufacture of hydrogenated products of furfurol, the use of a catalyst consisting of copper obtained by the reduction of copper oxide at 140 to 200 degrees C., said copper being placed upon the catalyst carriers which are in common use for catalysts.

10. Process for the manufacture of methylfurane which consists in vaporizing furfurol in a current of hot hydrogen in excess, in circulating the mixture upon copper heated to at least 80 degrees C., and in condensing the vapor discharged from the apparatus, the condensed liquid containing furfurol, furfuryl alcohol, methylfurane and water, in distilling the condensed liquid in such manner as to remove the methylfurane, in decanting the liquid resulting from the distillation, and in again causing the furfurol and the furfuryl alcohol thus removed to enter the operating circulation.

In testimony whereof we have signed this specification.

ELOI RICARD.
HENRI MARTIN GUINOT.